United States Patent
Park et al.

(10) Patent No.: US 11,522,651 B2
(45) Date of Patent: Dec. 6, 2022

(54) METHOD AND DEVICE FOR TRANSMITTING AND RECEIVING BETWEEN USER EQUIPMENT AND BASE STATION IN WIRELESS COMMUNICATION SYSTEM

(71) Applicant: LG Electronics Inc., Seoul (KR)

(72) Inventors: Hanjun Park, Seoul (KR); Changhwan Park, Seoul (KR); Suckchel Yang, Seoul (KR); Seonwook Kim, Seoul (KR)

(73) Assignee: LG Electronics Inc., Seoul (KR)

(*) Notice: Subject to any disclaimer, the term of this patent is extended or adjusted under 35 U.S.C. 154(b) by 341 days.

(21) Appl. No.: 16/065,734

(22) PCT Filed: Mar. 23, 2018

(86) PCT No.: PCT/KR2018/003431
§ 371 (c)(1),
(2) Date: Jun. 22, 2018

(87) PCT Pub. No.: WO2018/174633
PCT Pub. Date: Sep. 27, 2018

(65) Prior Publication Data
US 2021/0203459 A1 Jul. 1, 2021

Related U.S. Application Data

(60) Provisional application No. 62/480,550, filed on Apr. 3, 2017, provisional application No. 62/475,839, filed on Mar. 23, 2017.

(51) Int. Cl.
*H04L 5/00* (2006.01)

(52) U.S. Cl.
CPC .......... *H04L 5/0048* (2013.01); *H04L 5/0007* (2013.01)

(58) Field of Classification Search
CPC ... H04L 5/008; H04L 5/0053; H04L 27/2613; H04L 27/26134
See application file for complete search history.

(56) References Cited

U.S. PATENT DOCUMENTS 9,313,779 B2   4/2016  Han et al.
2006/0268671 A1  11/2006  Coon
(Continued)

FOREIGN PATENT DOCUMENTS

CN   102332965   1/2012
CN   102474375   5/2012
(Continued)

OTHER PUBLICATIONS

MediaTek Inc., "Considerations on sPUSCH design," 3GPP TSG RAN WG1 Meeting #88, dated Feb. 13-17, 2017, 4 pages.
(Continued)

*Primary Examiner* — Kevin Kim
(74) *Attorney, Agent, or Firm* — Fish & Richardson P.C.

(57) ABSTRACT

The present invention discloses a method for transmitting and receiving signals between a user equipment and a base station in a wireless communication system and device for supporting the same. More specifically, the invention discloses a signal transmission method applicable when a user equipment simultaneously transmits uplink control information and a reference signal to a base station.

14 Claims, 15 Drawing Sheets

(56) References Cited

U.S. PATENT DOCUMENTS

| | | | |
|---|---|---|---|
| 2009/0040919 | A1 | 2/2009 | Muharemovic et al. |
| 2010/0309775 | A1* | 12/2010 | Muharemovic ..... H04J 13/0062 |
| | | | 370/210 |
| 2013/0058361 | A1 | 3/2013 | Wu et al. |
| 2013/0287153 | A1* | 10/2013 | Sahlin .................. H04L 1/0036 |
| | | | 375/346 |
| 2016/0360529 | A1 | 12/2016 | Lee et al. |
| 2017/0311188 | A1* | 10/2017 | Sun ...................... H04L 5/0048 |
| 2020/0052835 | A1* | 2/2020 | Xiong .................. H04L 1/1861 |

FOREIGN PATENT DOCUMENTS

| | | |
|---|---|---|
| CN | 104065466 | 9/2014 |
| JP | 2006287931 | 10/2006 |
| JP | 2013535163 | 9/2013 |
| JP | 2018523954 | 8/2018 |
| KR | 20110048405 | 5/2011 |
| KR | 101055060 | 8/2011 |
| KR | 20160091733 | 8/2016 |

OTHER PUBLICATIONS

Iith et al., "Pre-DFT Multiplexing of RS and Data: Results on Short Duration One OFDM Symbol Uplink," 3GPP TSG RAN WG1 Meeting #88, dated Feb. 13-17, 2017, 8 pages.

U.S. Appl. No. 62/401,049, filed Sep. 28, 2016, Akkarakaran et al.

Mitsubishi Electric, "On the need of PT-RS for DFTsOFDM," R1-1700646, 3GPP TSG-RAN WG1 NR-AH 1701, Spokane, Washington, Jan. 16-20, 2017, 3 pages.

Notice of Allowance in Korean Application No. 10-2018-07013764, dated Oct. 25, 2018, 3 pages (with English Translation).

NTT DOCOMO, Inc., "UL control channel structure in long duration," 'R1-1700623', 3GPP TSG RAN WG1 AH_NR Meeting, Spokane, USA, Jan. 16-20, 2017, 6 pages.

Samsung, et al., "WF on NR UL control channel," 'R1-1610808', 3GPP TSG RAN WG1 Meeting #86bis, Lisbon, Portugal Oct. 10-14, 2016, 3 pages.

NTT DOCOMO, Inc., "UL control channel structure in short duration," 'R1-1700622', 3GPP TSG RAN WG1 AH_NR Meeting, Spokane, USA, Jan. 16-20, 2017, 9 pages.

Extended European Search Report in European Application No. 18772023.0, dated May 19, 2020, 14 pages.

Qualcomm Europe, "Flexible Data and Reference Multiplexing for LTE-Advanced Uplink: Link Performance at High Doppler Frequency," R1-090873, 3GPP TSG-RAN WG1 #56, Athens, Greece, dated Feb. 9-13, 2009, 6 pages, XP050318722.

Partial Supplementary European Search Report in European Application No. 18772023.0, dated Jan. 17, 2020, 14 pages.

Japanese Office Action in Japanese Application No. 2019-530413, dated Sep. 8, 2020, 8 pages (with English translation).

Texas Instruments, "Uplink Reference Signals in Support of High-Speed UEs," R1-074678, 3GPP TSG RAN WG1 #51, Jeju, Korea, dated Nov. 5-9, 2007, 6 pages.

CN Office Action in Chinese Appln. No. 201880016214.4, dated Jul. 1, 2021, 10 pages (with English translation).

Samsung, "Discussion on CSI-RS mapping for non-precoded CSI-RS based schemes," R1-152893, Presented at 3GPP TSG RAN WG1 Meeting #81, Fukuoka, Japan, May 25-29, 2015, 4 pages.

* cited by examiner

METHOD AND DEVICE FOR TRANSMITTING AND RECEIVING BETWEEN USER EQUIPMENT AND BASE STATION IN WIRELESS COMMUNICATION SYSTEM

CROSS-REFERENCE TO RELATED APPLICATIONS

This application is a National Stage application under 35 U.S.C. § 371 of International Application No. PCT/KR2018/003431, filed on Mar. 23, 2018, which claims the benefit of U.S. Provisional Application No. 62/480,550, filed on Apr. 3, 2017, and U.S. Provisional Application No. 62/475,839, filed on Mar. 23, 2017. The disclosures of the prior applications are incorporated by reference in their entirety.

TECHNICAL FIELD

The present invention relates to a wireless communication system, and more particularly, to a method for transmitting and receiving signals between a user equipment and a base station in a wireless communication system and device for supporting the same.

More specifically, the invention is directed to a signal transmission method applicable when a user equipment simultaneously transmits uplink control information and a reference signal to a base station.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE OF THE INVENTION

Technical Task

An object of the present invention is to provide a method for transmitting and receiving signals between a user equipment and a base station in a wireless communication system and devices for supporting the same.

Another object of the present invention is to provide a method for efficiently generating signal samples and a method for transmitting and receiving signals based on the generated signal samples when a user equipment simultaneously transmits a reference signal and data.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method for transmitting and receiving signals between a user equipment and a base station in a wireless communication system and devices for supporting the same.

In an aspect of the present invention, provided herein is a method for transmitting a signal to a base station (BS) by a user equipment (UE) in a wireless communication system. The method may include: generating time-domain samples for a reference signal (RS) and data, which are mapped to one symbol, wherein the time-domain samples may be arranged in the following time-domain order: first RS samples, data samples, and second RS samples; and transmitting a signal generated by applying transform precoding to the generated time-domain samples to the BS.

In another aspect of the present invention, provided herein is a user equipment (UE) for transmitting a signal to a base station (BS) in a wireless communication system. The UE may include: a transmitter; and a processor connected to the transmitter, wherein the processor may be configured to: generate time-domain samples for a reference signal (RS) and data, which are mapped to one symbol, wherein the time-domain samples may be arranged in the following time-domain order: first RS samples, data samples, and second RS samples; and transmit a signal generated by applying transform precoding to the generated time-domain samples to the BS.

In this configuration, the data samples may be uplink control information (UCI) samples.

In addition, the first RS samples may be some of the second RS samples.

Moreover, the second RS samples may be some of the first RS samples.

Further, the transform precoding may be discrete Fourier transform (DFT) precoding for the generated time-domain samples.

In a further aspect of the present invention, provided herein is a method for receiving a signal from a user equipment (UE) by a base station (BS) in a wireless communication system. The method may include: receiving the signal from the UE; estimating a transmission channel by applying a discrete Fourier transform (DFT) operation to samples in a first time window of the received signal; extracting data samples by compensating for channel values for samples in a second time window using the estimated transmission channel; and obtaining data information based on the extracted data samples.

In a still further aspect of the present invention, provided herein is a base station (BS) for receiving a signal from a user equipment (UE) in a wireless communication system. The BS may include: a receiver; and a processor connected to the receiver, wherein the processor may be configured to: receive the signal from the UE; estimate a transmission channel by applying a discrete Fourier transform (DFT)

operation to samples in a first time window of the received signal; extract data samples by compensating for channel values for samples in a second time window using the estimated transmission channel; and obtain data information based on the extracted data samples.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present invention, a receiver that intends to receive a signal (e.g., BS) can receive and device data, which a transmitter (e.g., UE) desires to transmit through the signal, with high reliability.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE FOR INVENTION

Figure 1:
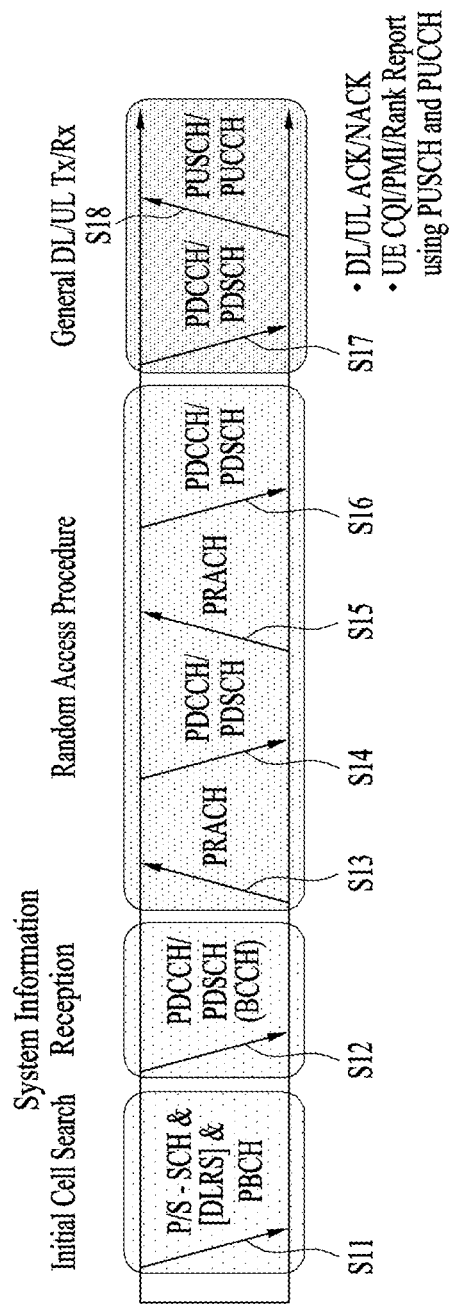
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system, and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1.3GPP LTE/LTE-A System 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
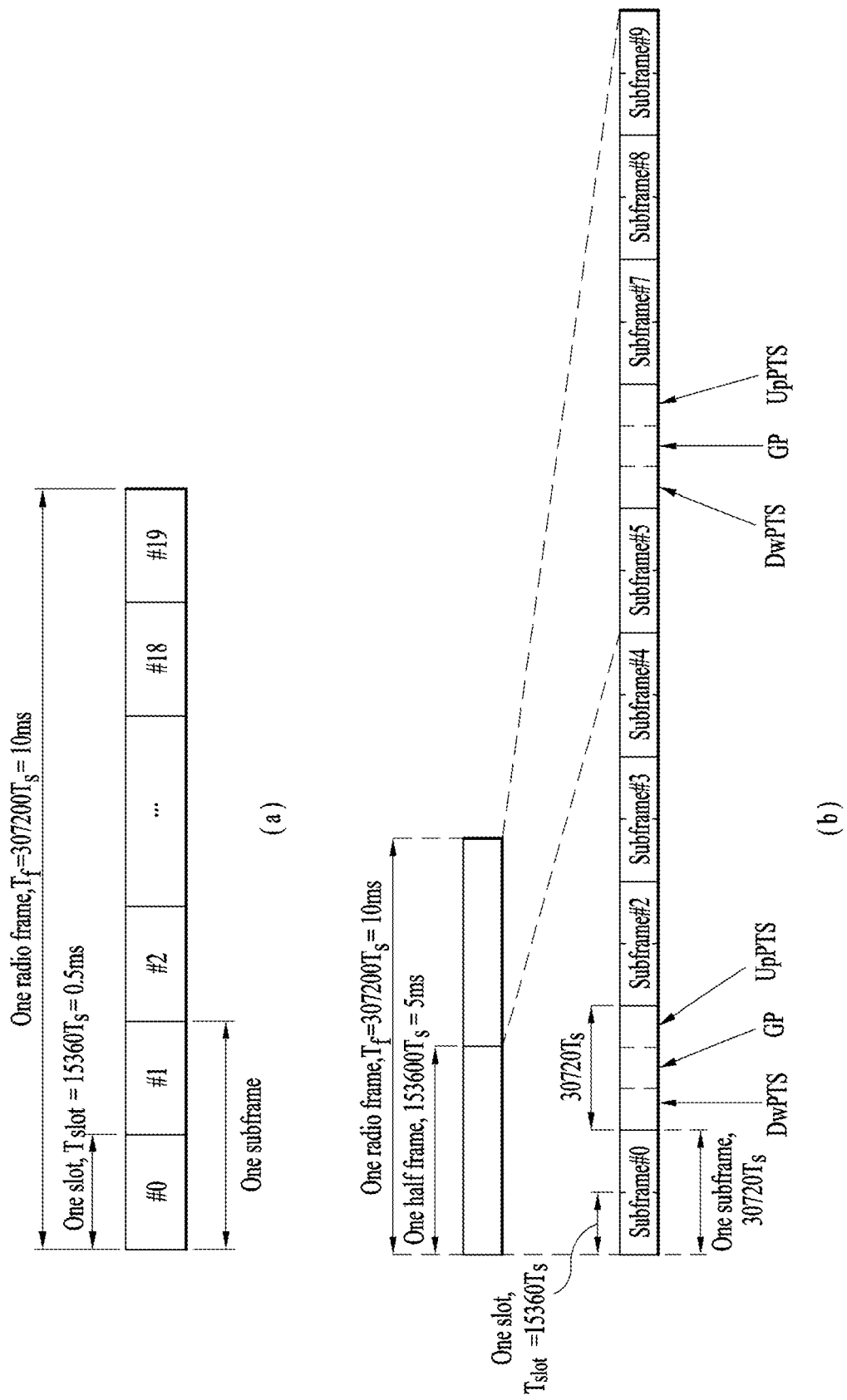
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | | Normal cyclic prefix in downlink | | | Extended cyclic prefix in downlink | | |
| | | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

In addition, in the LTE Rel-13 system, it is possible to newly configure the configuration of special subframes (i.e., the lengths of DwPTS/GP/UpPTS) by considering the number of additional SC-FDMA symbols, X, which is provided by the higher layer parameter named "srs-UpPtsAdd" (if this parameter is not configured, X is set to 0). In the LTE Rel-14 system, specific subframe configuration #10 is newly added. The UE is not expected to be configured with 2 additional UpPTS SC-FDMA symbols for special subframe configurations {3, 4, 7, 8} for normal cyclic prefix in downlink and special subframe configurations {2, 3, 5, 6} for extended cyclic prefix in downlink and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink.)

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | — | — | — |

Figure 3:
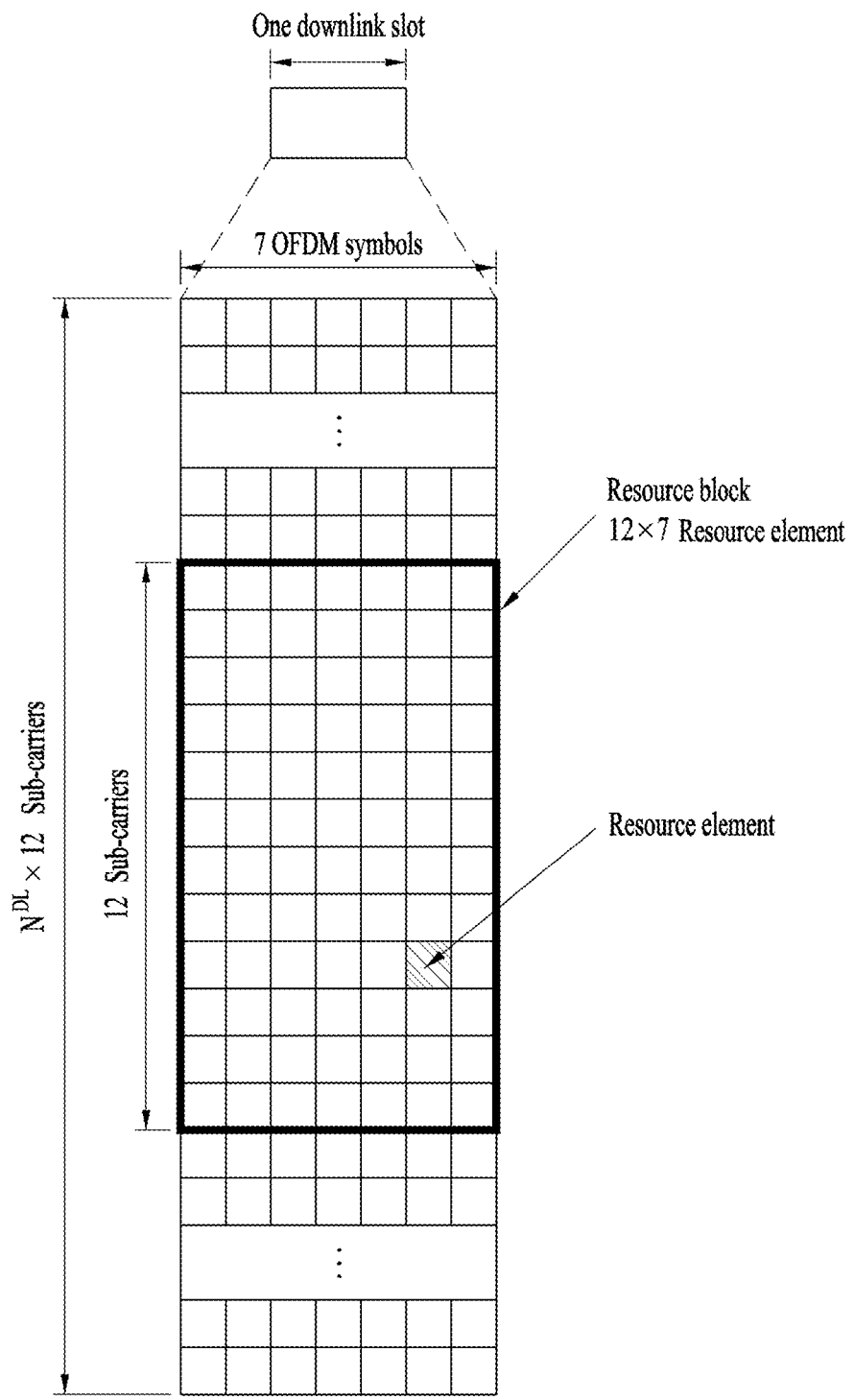
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth.

Figure 4:
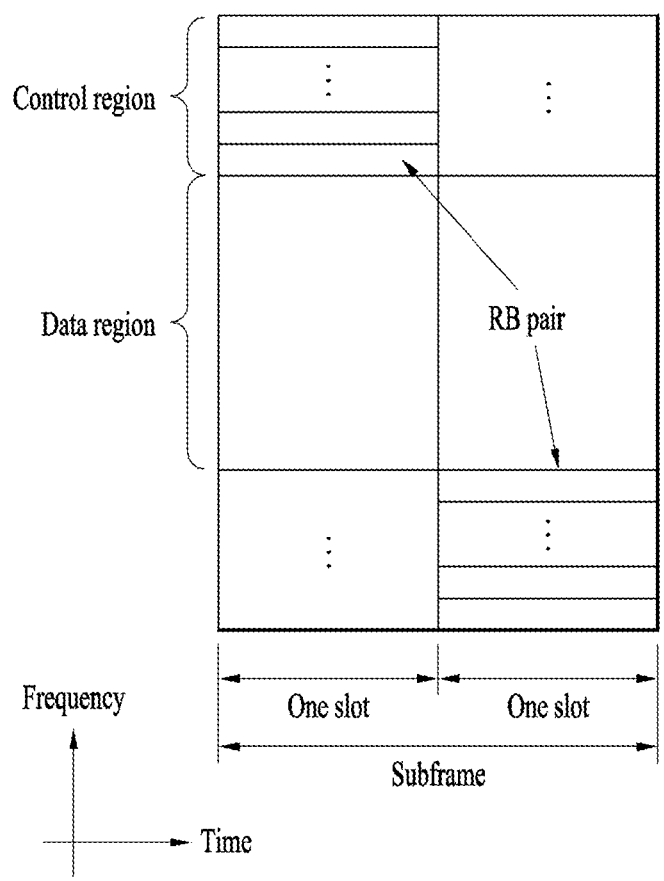
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
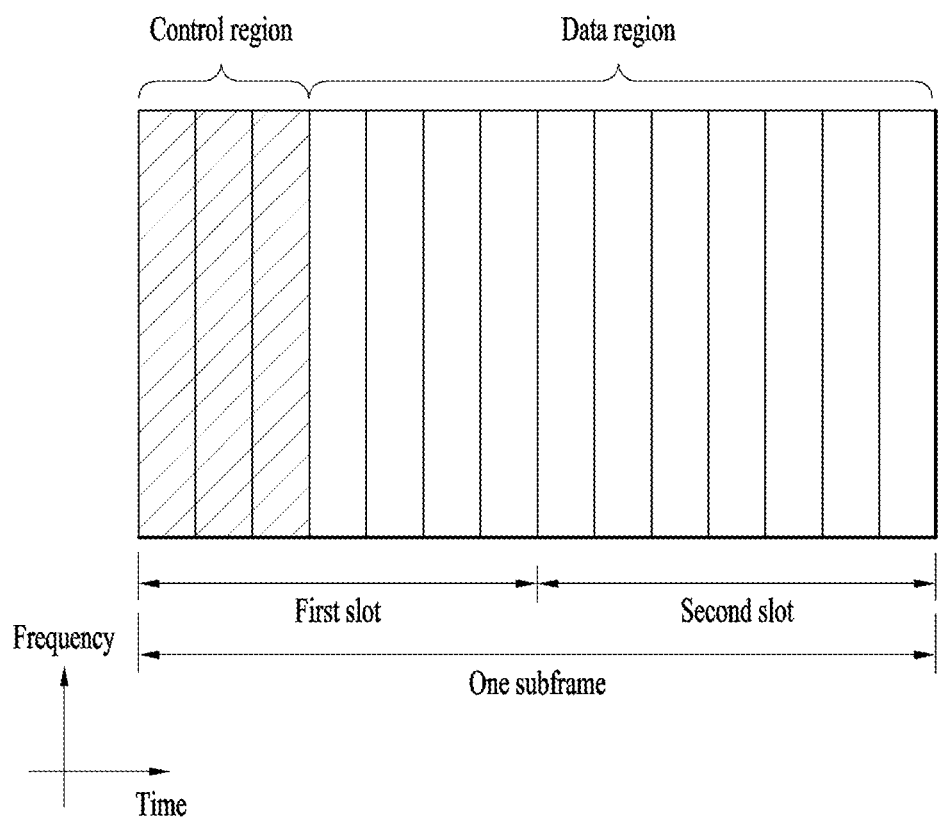
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. New Radio Access Technology System

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, Ultra-reliable and low latency communication (URLLC), and the like, a new RAT system has been proposed. In the present invention, the corresponding technology is referred to as the new RAT or new radio (NR) for convenience of description.

2.1. Numerologies

The NR system to which the present invention is applicable supports various OFDM numerologies shown in the following table. In this case, the value of μ and cyclic prefix information per carrier bandwidth part can be signaled in DL and UL, respectively. For example, the value of μ and cyclic prefix information per downlink carrier bandwidth part may be signaled though DL-BWP-mu and DL-MWP-cp corresponding to higher layer signaling. As another example, the value of μ and cyclic prefix information per uplink carrier bandwidth part may be signaled though UL-BWP-mu and UL-MWP-cp corresponding to higher layer signaling.

TABLE 3

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

Regarding the subcarrier spacing μ, slots may be numbered within one subframe in ascending order like $n_s^\mu \in \{0, \ldots, N_{slot}^{subframe, \mu} - 1\}$ and may also be numbered within a frame in ascending order like $n_{s,f}^\mu \in \{0, \ldots N_{slot}^{frame, \mu} - 1\}$. In this case, the number of consecutive OFDM symbols in one slot ($N_{symb}^{slot}$) may be determined as shown in the following table according to the cyclic prefix. The start slot ($n_s^\mu$) of one subframe is aligned with the start OFDM symbol ($n_s^\mu N_{symb}^{slot}$) of the same subframe in the time dimension. Table 4 shows the number of OFDM symbols in each slot/frame/subframe in the case of the normal cyclic prefix, and Table 5 shows the number of OFDM symbols in each slot/frame/subframe in the case of the extended cyclic prefix.

TABLE 4

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| $\mu$ | $N_{symb}^{slot}$ | $N_{slot}^{frame, \mu}$ | $N_{slot}^{subframe, \mu}$ |
|---|---|---|---|
| 2 | 12 | 40 | 4 |

In the NR system to which the present invention can be applied, a self-contained slot structure can be applied based on the above-described slot structure.

Figure 6:
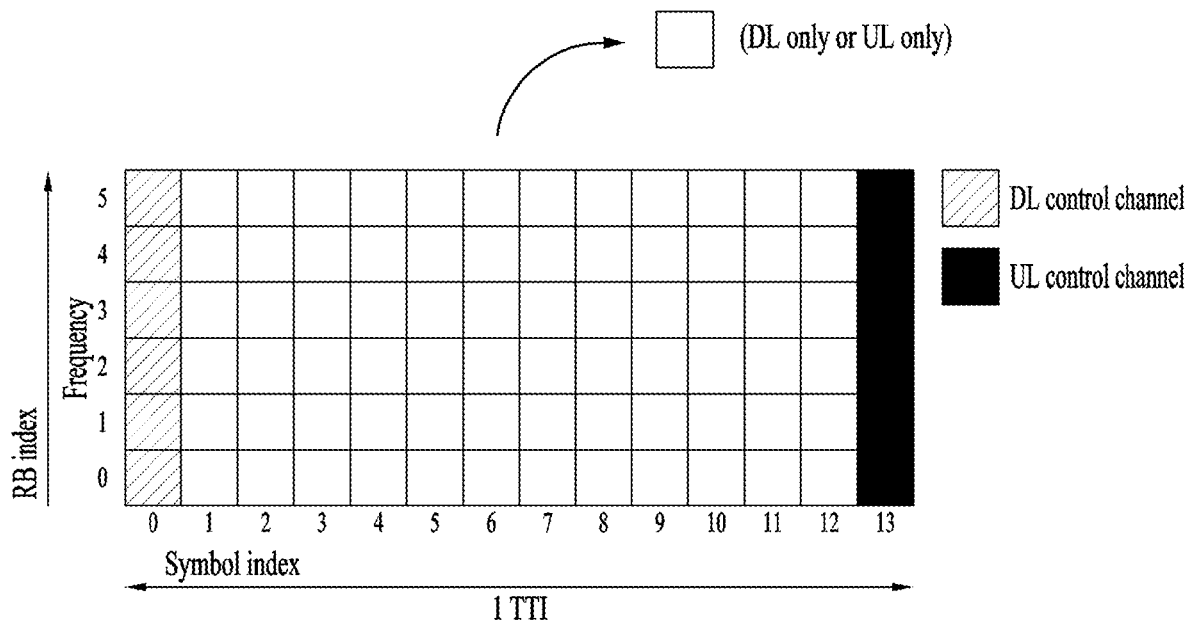
FIG. 6 is a diagram illustrating a self-contained subframe structure applicable to the present invention.

FIG. 6 is a diagram illustrating a self-contained slot structure applicable to the present invention.

In FIG. 6, the hatched area (e.g., symbol index=0) indicates a downlink control region, and the black area (e.g., symbol index=13) indicates an uplink control region. The remaining area (e.g., symbol index=1 to 13) can be used for DL or UL data transmission.

Based on this structure, the eNB and UE can sequentially perform DL transmission and UL transmission in one slot. That is, the eNB and UE can transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the eNB and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions can be selectively included in the self-contained slot structure. In other words, the self-contained slot structure according to the present invention may include either the DL control region or the UL control region as well as both the DL and UL control regions as shown in FIG. 6.

In addition, for example, the slot may have various slot formats. In this case, OFDM symbols in each slot can be divided into downlink symbols (denoted by 'D'), flexible symbols (denoted by 'X'), and uplink symbols (denoted by 'U').

Thus, the UE can assume that DL transmission occurs only in symbols denoted by 'D' and 'X' in the DL slot. Similarly, the UE can assume that UL transmission occurs only in symbols denoted by 'U' and 'X' in the UL slot.

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
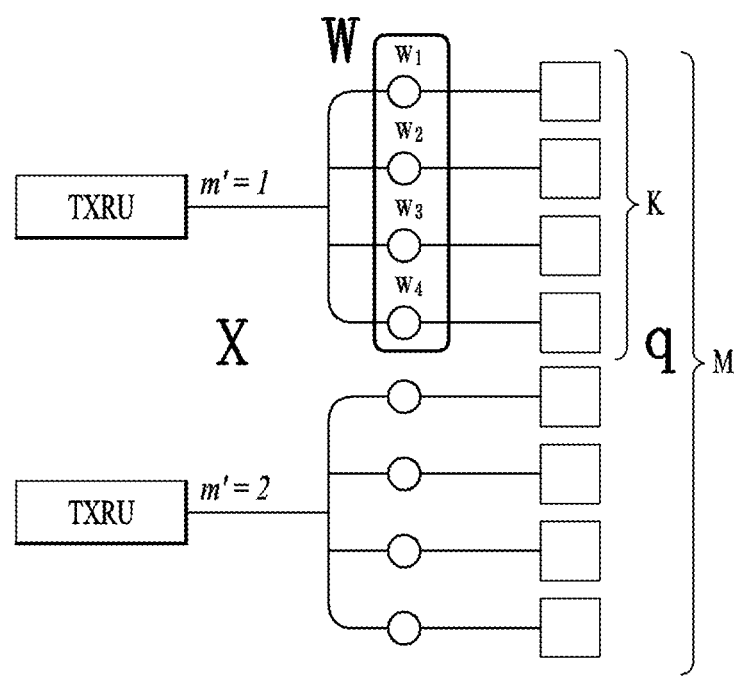
FIGS. 7 and 8 are diagrams illustrating representative connection methods for connecting TXRUs to antenna elements.
Figure 8:
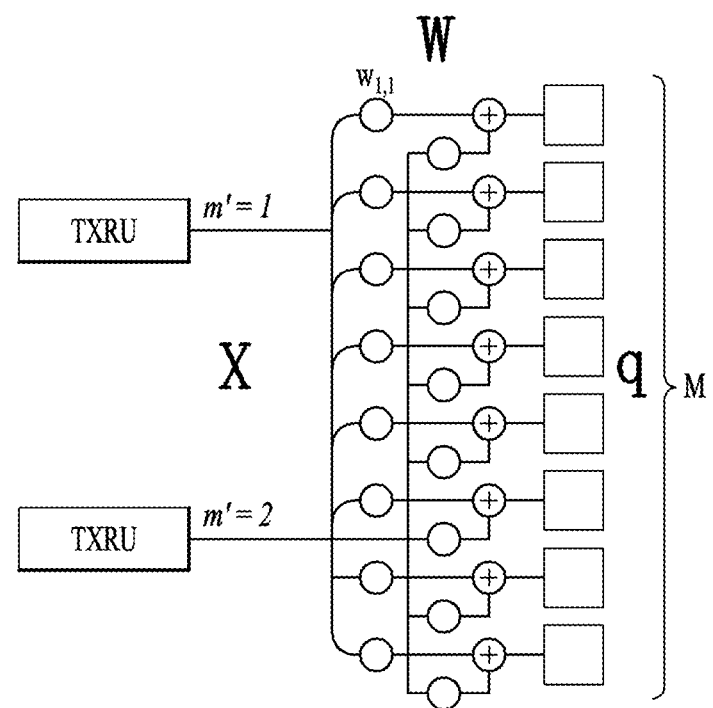

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to sub-arrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

When a plurality of antennas are used in the NR system to which the present invention is applicable, the hybrid beamforming method obtained by combining the digital beamforming and analog beamforming can be applied. In this case, the analog (or radio frequency (RF)) beamforming means the operation where precoding (or combining) is performed at the RF end. In the case of the hybrid beamforming, precoding (or combining) is performed at the baseband end and RF end, respectively. Thus, the hybrid beamforming is advantageous in that it guarantees the performance similar to the digital beamforming while reducing the number of RF chains and D/A (digital-to-analog) (or A/D (analog-to-digital) z converters.

For convenience of description, the hybrid beamforming structure can be represented by N transceiver units (TXRUs) and M physical antennas. In this case, the digital beamforming for L data layers to be transmitted by the transmitting end may be represented by the N*L (N by L) matrix. Thereafter, N converted digital signals are converted into analog signals by the TXRUs, and then the analog beamforming, which may be represented by the M*N (M by N) matrix, is applied to the converted signals.

Figure 9:
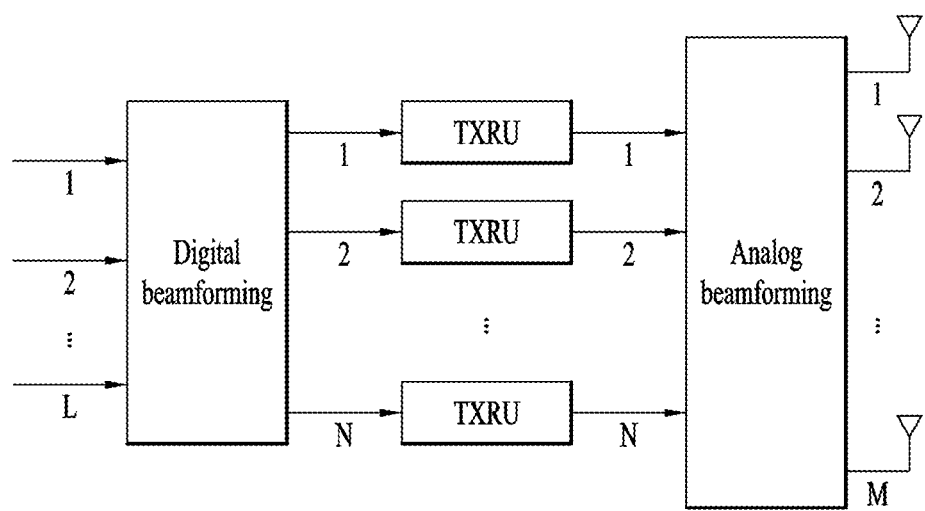
FIG. 9 is a schematic diagram illustrating a hybrid beamforming structure according to an embodiment of the present invention from the perspective of TXRUs and physical antennas.

FIG. 9 is a schematic diagram illustrating a hybrid beamforming structure according to an embodiment of the present invention from the perspective of TXRUs and physical antennas. In FIG. 9, it is assumed that the number of digital beams is L and the number of analog beams is N.

Additionally, a method for providing efficient beamforming to UEs located in a specific area by designing an eNB capable of changing analog beamforming on a symbol basis has been considered in the NR system to which the present invention is applicable. Further, a method of introducing a plurality of antenna panels where independent hybrid beamforming can be applied by defining N TXRUs and M RF antennas as one antenna panel has also been considered in the NR system to which the present invention is applicable.

When the eNB uses a plurality of analog beams as described above, each UE has a different analog beam suitable for signal reception. Thus, the beam sweeping operation where the eNB applies a different analog beam per symbol in a specific subframe (SF) (at least with respect to synchronization signals, system information, paging, etc.) and then perform signal transmission in order to allow all UEs to have reception opportunities has been considered in the NR system to which the present invention is applicable.

Figure 10:
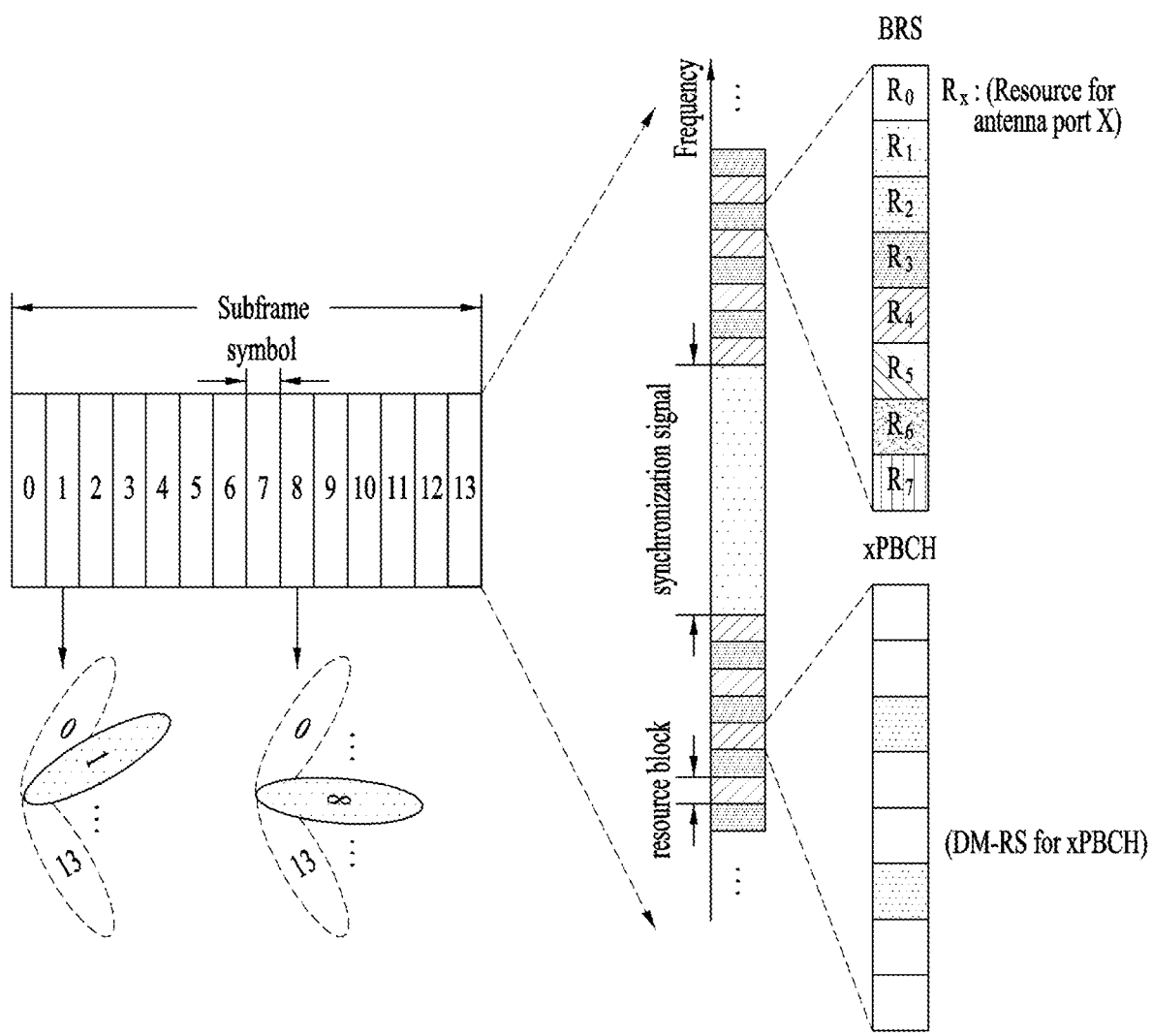
FIG. 10 is a diagram schematically illustrating the beam sweeping operation for synchronization signals and system information during a downlink (DL) transmission process according to an embodiment of the present invention.

FIG. 10 is a diagram schematically illustrating the beam sweeping operation for synchronization signals and system information during a downlink (DL) transmission process according to an embodiment of the present invention.

In FIG. 10, a physical resource (or channel) for transmitting system information of the NR system to which the present invention is applicable in a broadcasting manner is referred to as a physical broadcast channel (xPBCH). In this case, analog beams belonging to different antenna panels can be simultaneously transmitted in one symbol.

In addition, as shown in FIG. 10, the introduction of a beam reference signal (BRS) corresponding to the reference signal (RS) to which a single analog beam (corresponding to a specific antenna panel) is applied has been discussed as the configuration for measuring a channel per analog beam in the NR system to which the present invention is applicable. The BRS can be defined for a plurality of antenna ports, and each BRS antenna port may correspond to a single analog beam. In this case, unlike the BRS, all analog beams in the analog beam group can be applied to the synchronization signal or xPBCH unlike the BRS to assist a random UE to correctly receive the synchronization signal or xPBCH.

3. Proposed Embodiments

Hereinafter, the configuration proposed in the present invention will be described in detail based on the above-discussed technical features.

Specifically, the present invention describes in detail a physical uplink control channel (PUCCH) transmission and reception structure and operation for allowing a receiving end to distinguish between a modulation signal for uplink control information (UCI) and a reference signal (RS) at relatively low complexity when the discrete Fourier transform (DFT) operation (or DFT precoding) is applied after combining the modulation signal for the UCI with the RS in a time division multiplexing (TDM) manner for a specific orthogonal frequency division multiplexing (OFDM) symbol in the PUCCH, which is a physical channel for uplink (UL) control signal transmission in a wireless communication system composed of a base station (BS) and a user equipment (UE). Accordingly, the signals to which the DFT operation (or DFT precoding) is applied can be transmitted on a subcarrier or some (consecutive) subcarrier(s) among all subcarriers in the OFDM symbol.

In the NR system to which the present invention is applicable, a plurality of OFDM symbols are defined as a basic time unit for data scheduling, and in order to report ACK/NACK (Acknowledgement/Negative Acknowledgement) indicating success or failure of data reception in a specific slot (in terms of decoding) (to the BS) as soon as possible, the PUCCH, which is a physical channel for ACK/NACK information transmission, can be TDMed with a data channel and transmitted in a relatively short time interval as shown in FIG. 6. For example, after determining ACK/NACK for DL data in a specific slot, the UE may report, to the BS, ACK/NACK information on a rear OFDM symbol(s) (in the time domain) within the same slot through the PUCCH.

The PUCCH can carry not only ACK/NACK information but also important UL control information such as channel state information (CSI) feedback, scheduling request (SR), etc. Accordingly, it may be desirable to design the PUCCH to have a wide transmission region (or UL coverage). To this end, the UE should be able to use the (average) transmission power for PUCCH transmission as high as possible.

Meanwhile, when the UE transmits an OFDM-based signal, there may be a restriction on the transmission power due to nonlinearity of a power amplifier (PA). For example, when the Peak-to-Average Power Ratio (PAPR) of an OFDM signal is high, the UE should reduce the average signal power such that the amplitude fluctuation range of a signal transmitted in the time domain is included in the input signal range where the linearity of the PA is guaranteed. Thus, it may be desirable to design the PUCCH signal to have a low PAPR to allow the UE to perform PUCCH transmission with high (average) transmission power.

Figure 11:
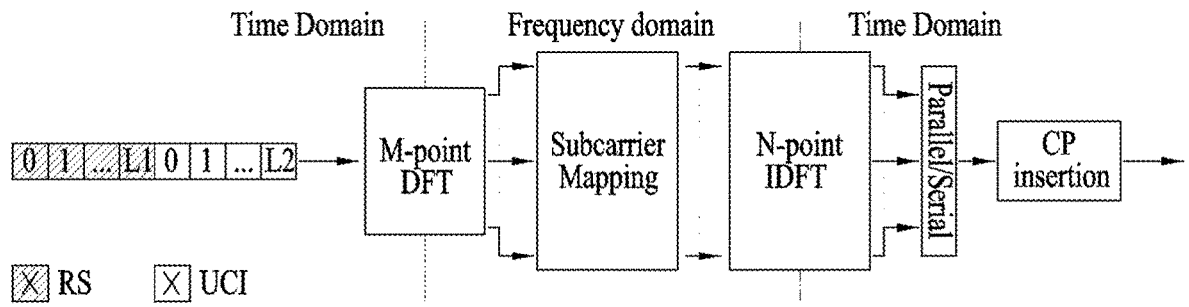
FIG. 11 schematically illustrates a PUCCH configuration method according to an embodiment of the present invention.

FIG. 11 schematically illustrates a PUCCH configuration method according to an embodiment of the present invention.

As a method for reducing the PAPR when the UE transmits the PUCCH, the UE may perform transmission as shown in FIG. 11 instead of directly transmitting a modulation signal for UCI and an RS on specific subcarriers in an OFDM symbol. More specifically, as shown in FIG. 11, the UE may generate M samples (where M=L1+L2) by combining L1 RS symbols and L2 modulation symbols for UCI in a TDM manner, apply the M-point DFT operation (or DFT precoding), and then perform transmission on M specific (consecutive) subcarriers in the OFDM symbol.

In general, when a radio signal goes through a channel, a receiver may interpret that the signal is transmitted via multiple paths with different time delay. Thus, when the UE performs transmission after applying the DFT precoding by combining the modulation signal for the UCI and the RS in a specific OFDM symbol in transmitting the PUCCH, interference may occur because there is no separate guard time (or period) between the modulation signal for the UCI and the RS.

Figure 12:
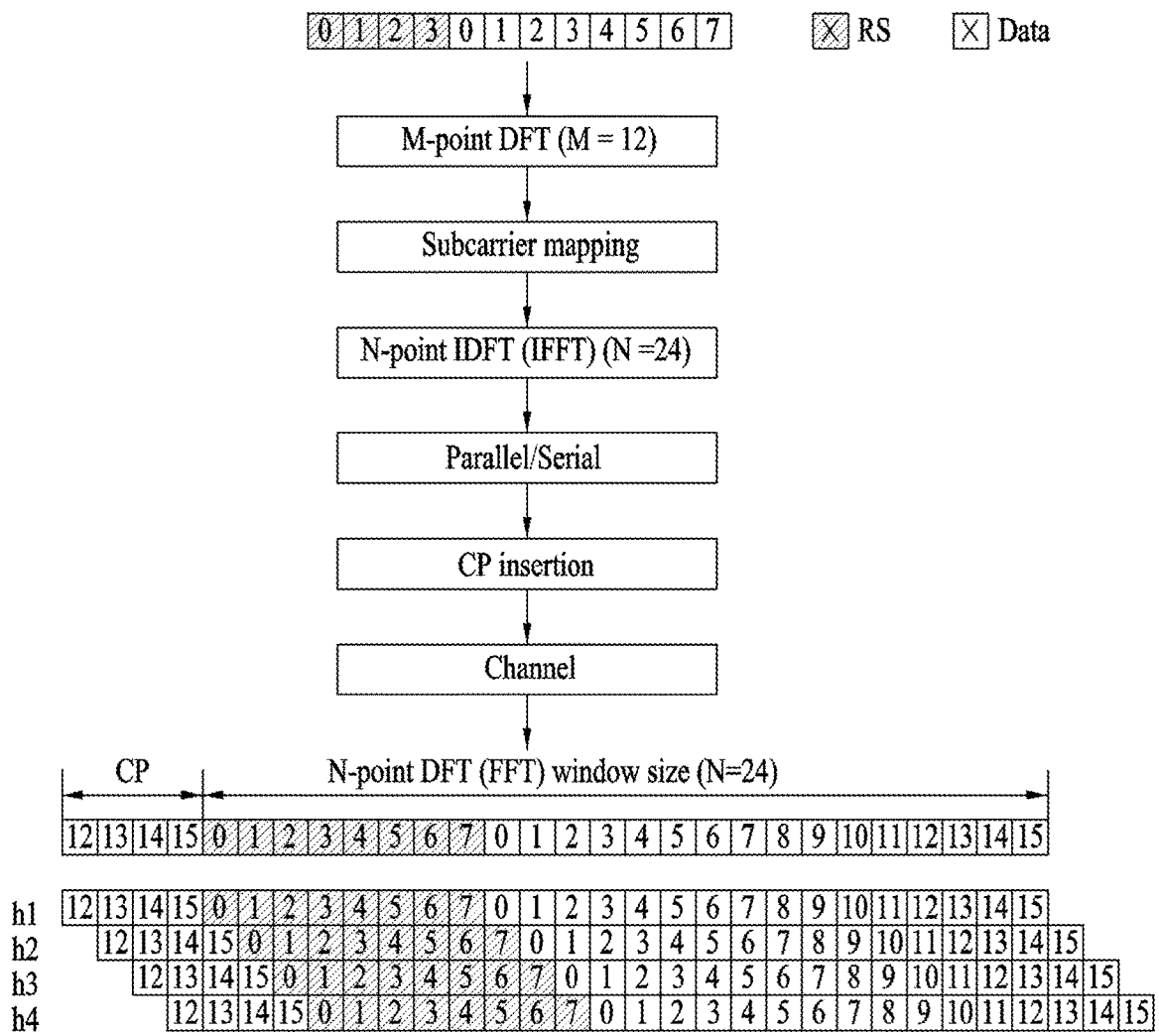
FIG. 12 schematically illustrates a signal reception operation via a plurality of paths.

FIG. 12 schematically illustrates a signal reception operation via a plurality of paths.

FIG. 12 shows signals received through individual paths when a PUCCH signal (i.e., a signal transmitted after combining four RS samples and eight modulation signal samples for data (e.g., UCI) in a TDM manner, applying the 12-point DFT precoding, and then applying Subcarrier Mapping, 24-point IDFT (or FFT), Parallel to Serial, CP (Cyclic Prefix) insertion processes thereto) is transmitted through multiple paths corresponding to four channels, which have different time delay and channel gains of h1, h2, h3 and h4, respectively. In this case, the final received signal may be expressed by the sum of the signals received through the multiple paths.

When different time-domain signals (e.g., modulation signal for UCI and RS) experience mutual interference due to multipath delay of a channel as shown in FIG. 12, a received end cannot distinguish between the modulation signal for data (e.g., UCI) and RS, whereby a complex reception scheme such as a rake receiver may be required.

Accordingly, the present invention describes in detail a PUCCH transmission and reception structure and operation for allowing a receiving end to distinguish between data and an RS when a UE transmits a PUCCH by applying DFT precoding after combining the data and RS in a TDM manner before DFT precoding in performing transmission on a specific OFDM symbol.

In this case, the present invention considers not only a case where the UCI and RS are TDMed within one symbol before DFT precoding when a PUCCH composed of one or two OFDM symbols is transmitted but a case where the UCI and RS are TDMed within one symbol before DFT precoding when a PUSCH composed of one or two OFDM symbols is transmitted.

Although the configurations proposed in the present invention are described in terms of UL control signal transmission in the NR system for convenience of description, the operation principle of each proposed method can be extensively applied to an arbitrary wireless communication system where DFT precoding is applied when OFDM symbols are generated based on N-point DFT/IDFT. Accordingly, in the following description, an entity that transmits a signal and an entity that receives a signal are respectively referred to as a transmitter and a receiver.

3.1 Separation of UCI and RS in Time Domain

When a transmitter performs M-point (M≤N) DFT Precoding (before generating OFDM symbols based on N-point DFT/IDFT), the transmitter may arrange modulation signals for an RS first, arrange modulation signals for data, and then arrange the duplication of some rear signals of the modulation signals for the RS in order to configure M time-domain samples in the time domain.

Assuming that the RS is represented by r[0], r[1], r[2], r[L1] and the data is represented by d[0], d[1], d[2], d[L2], the M (=L1+L2+K) samples for the M-point DFT precoding can be determined according to Equation 1.

$$X=[r[0],r[1],r[L1],d[0],d[1],d[2],\ldots,d[L2],r[L1-(K-1)],r[L1-(K-2)],\ldots,r[L1]]$$ [Equation 1]

In Equation 1, the value of K (the ratio between M and K or the ratio between L1 and K) may be determined between the BS and UE according to a predetermined method or configured by the BS through a higher layer signal (e.g., RRS signaling) or a dynamic control signal (e.g., L1/L2 signaling).

When the BS indicates one among a plurality of states for the values of K through the higher layer signal or dynamic control signal, the value of K corresponding to each state could be differently interpreted according to the CP length of the OFDM symbol, the number of transmission samples to be DFT-precoded (i.e., M), and/or the RS overhead (predetermined or configured by the BS).

When the BS configures the specific ratio value R (0<R≤1) through the higher layer signal (e.g., RRC signaling) or dynamic control signal (e.g., L1/L2 signaling), the UE may calculate the value of K based on the value of R according to a predetermined method. For example, the UE may calculate the value of K as K=ceil(M*R). Here, ceil(X) means the smallest integer among integers equal to or more than X. In the case of K=0, if the number of RS transmission samples, L1 and the number of data transmission samples, L2 are determined according to the predetermined method or configured by the BS, the UE may reduce the number of RS transmission samples (L1'=L1−K) or the number of data transmission samples (L2'=L2−K) based on the overhead for the calculated value of K (K>0).

In the above-described operation, if the data and RS are respectively replaced with the RS and data, the same operation may be applied (that is, it is possible to arrange modulation signals for data first, arrange modulation signal for an RS, and then arrange the duplication of some rear signals of the modulation signals for the data).

As shown in FIG. 12, when M samples corresponding to input signals for DFT precoding are configured, some rear signals for the RS are duplicated before M-point DFT precoding and then arranged at the back.

Figure 13:
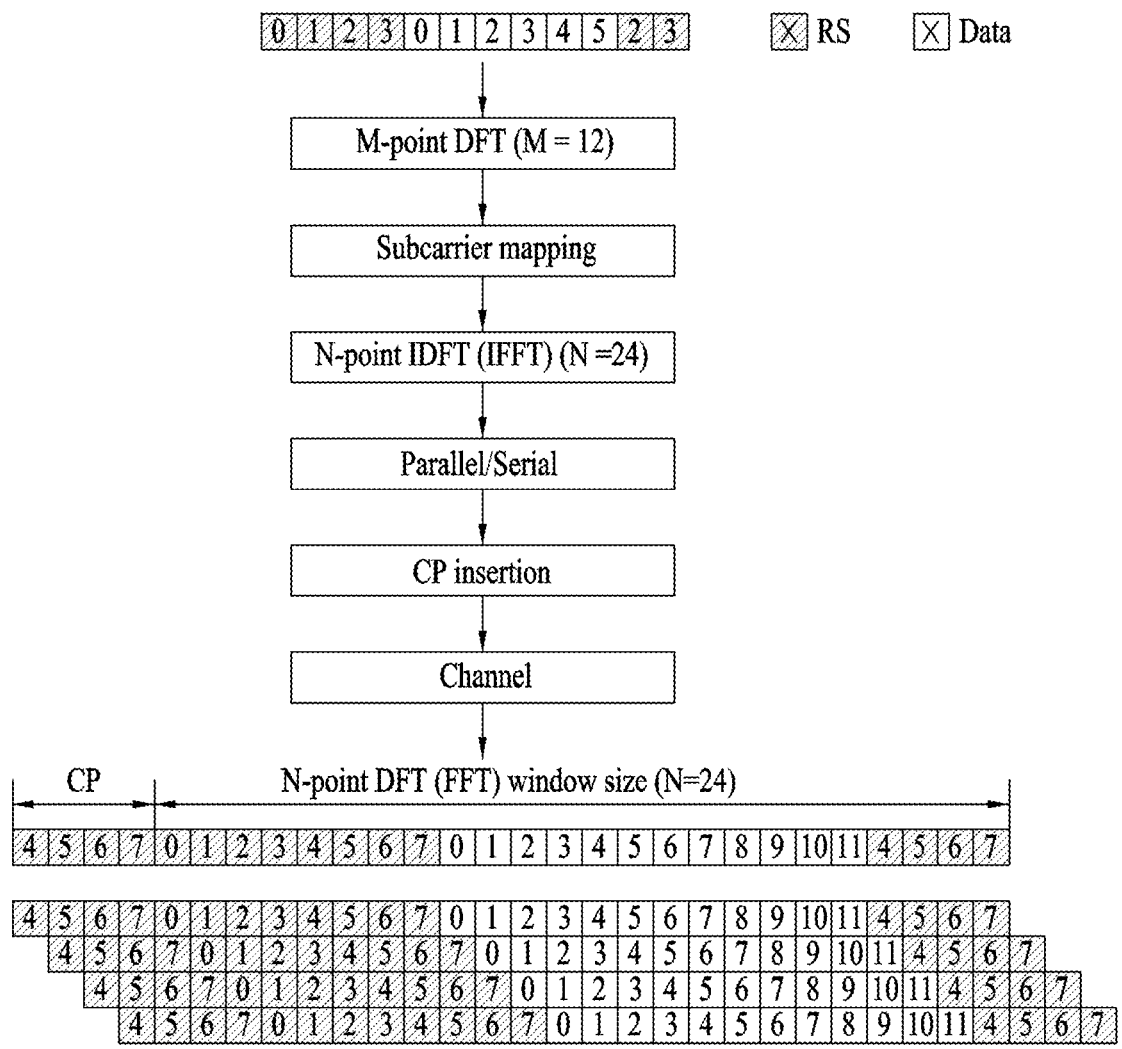
FIG. 13 schematically illustrates an operation where in the configuration of FIG. 12, the last two symbols for the RS are duplicated before DFT precoding and arranged behind the M samples.

FIG. 13 schematically illustrates an operation where in the configuration of FIG. 12, the last two symbols for the RS are duplicated before DFT precoding and arranged behind the M samples.

According to the configuration of FIG. 13, when a CP is applied to the OFDM symbol, the duplication of some rear signals for the RS is included in the CP so that it is possible to obtain the effect as if the CP is applied for the RS from the perspective of RS transmission.

Referring to the first eight samples in the N-point DFT widow show in FIG. 13, a receiver may receive a signal as if the CP for the RS is transmitted together with the RS. In addition, regarding the last sixteen samples in the (N-point DFT) widow where twelve data samples are combined with four RS samples, the receiver may receive a signal as if the CP therefor is applied.

Figure 14:
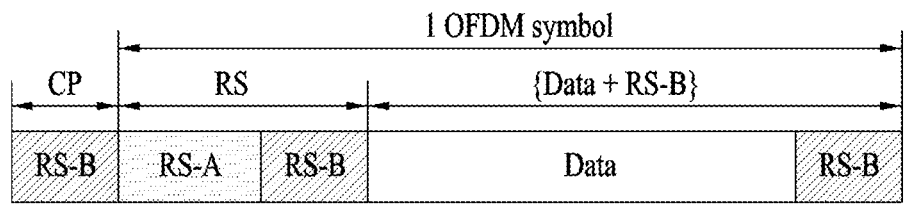
FIG. 14 schematically illustrates the RS and data structures in one OFDM symbol applicable to the present invention.

FIG. 14 schematically illustrates the RS and data structures in one OFDM symbol applicable to the present invention.

Hereinafter, the aforementioned configuration will be described in general terms. Referring to FIG. 14, when the RS and data are sequentially arranged in the time domain, the entire OFDM symbol may be configured by arranging the duplication of the RS-B portion, which is included in the RS composed of the front RS-A portion and the rear RS-B portion, behind the data portion.

In this case, the CP for one OFDM symbol may include the duplication of some or all of RS-B. In this case, the process for arranging the duplication of RS-B at the back of the OFDM symbol may be performed before DFT precoding as shown in FIG. 13, or it may be performed for the time-domain signal that is generated after performing DFT Precoding, Subcarrier mapping, and N-point IDFT (IFFT).

The configuration described in this section can be summarized as follows.

(1) The transmitter arranges an RS and data (e.g., UCI) in a TDM manner (that is, in an FDM manner on virtual frequency).

In this case, for example, the RS and UCI may be arranged in the form of (entire) RS/(entire) UCI/(partial) RS. Here, the partial RS may correspond to a rear part of the entire RS (that is, the partial RS may be the duplication of the rear part of the entire RS).

Alternatively, as another example, the RS and UCI may be arranged in the form of (entire) UCI/(entire) RS/(partial) UCI. In this case, the partial UCI may correspond to a rear part of the entire UCI (that is, the partial UCI may be the duplication of the rear part of the entire UCI).

Alternatively, as a further example, the RS and UCI may be arranged in the form of (partial) RS/(entire) UCI/(entire) RS. In this case, the partial RS may correspond to a front part of the entire RS (that is, the partial RS may be the duplication of the front part of the entire RS).

Alternatively, as still another example, the RS and UCI may be arranged in the form of (partial) UCI/(entire) RS/(entire) UCI. In this case, the partial UCI may correspond to a front part of the entire UCI (that is, the partial UCI may be the duplication of the front part of the entire UCI).

Alternatively, as still a further example, the RS and UCI may be arranged in the form of (entire) UCI/(partial) RS/(entire) RS. In this case, the partial RS may correspond to a rear part of the entire RS (that is, the partial RS may be the duplication of the rear part of the entire RS).

(2) In this state, the transmitter may be configured to generate a signal by performing the IFFT process on the output signal, which goes through the DFT process and then transmit the signal.

(3) This signal transmission method can be equally applied not only to UCI transmission but also UL data transmission, downlink control information (DCI) or DL data transmission, or sidelink control information (SCI) or sidelink (SL) data transmission.

(4) Further, in this signal transmission method, the transmitting/receiving ends are not limited to the UE/BS, but the transmitting/receiving ends can be extended to the BS/UE or UE/UE.

Figure 15:
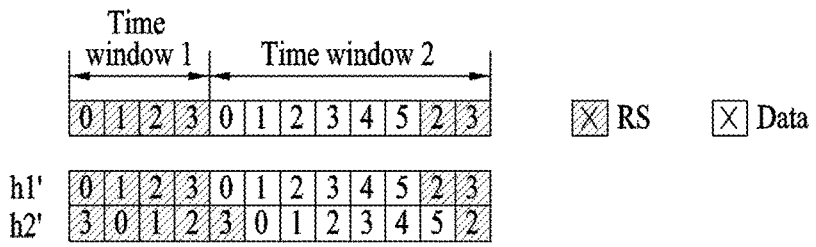
FIG. 15 schematically illustrates down-sampling of samples in the N-point DFT window shown in FIG. 13.

FIG. 15 schematically illustrates down-sampling of samples in the N-point DFT window shown in FIG. 13.

More specifically, in FIG. 13, if the receiver performs N-point DFT (FFT), subcarrier de-mapping, and/or M-point IDFT after eliminating the CP, the samples within the N-pint DFT window of FIG. 13 may be expressed in the form of down-sampling as shown in FIG. 15. In FIG. 15, h1' and h2' respectively indicate effective channel gains in narrow bands where signals are transmitted.

Thereafter, the receiver estimates a channel in time window 1 of FIG. 15. In addition, the receiver may apply the DFT operation to time window 2, compensates for frequency-domain channel values (e.g., equalizing) in the frequency domain using the estimated channel, and then extract only UCI through reverting to the time domain by applying the IDFT operation again (on the signals in time window 2 of which the channel values are compensated for).

When the UE performs transmission after applying DFT precoding by combining the data and RS according to the above-described configuration, the receiver may receive a signal where the CP for the RS is applied (without interference from the UCI) within the front time window (hereinafter referred to as time window 1) (which corresponds to or is in proportion to the length of the RS) of the received signal (after applying the N-point DFT (FFT), subcarrier de-mapping, and/or M-point IDFT operation to a received OFDM symbol or applying the N-point DFT (FFT), Frequency domain filtering, and/or N-point IDFT (IFFT) operation to a received OFDM symbol) and then perform the channel estimation based on time-domain (or frequency-domain) operation.

Figure 16:
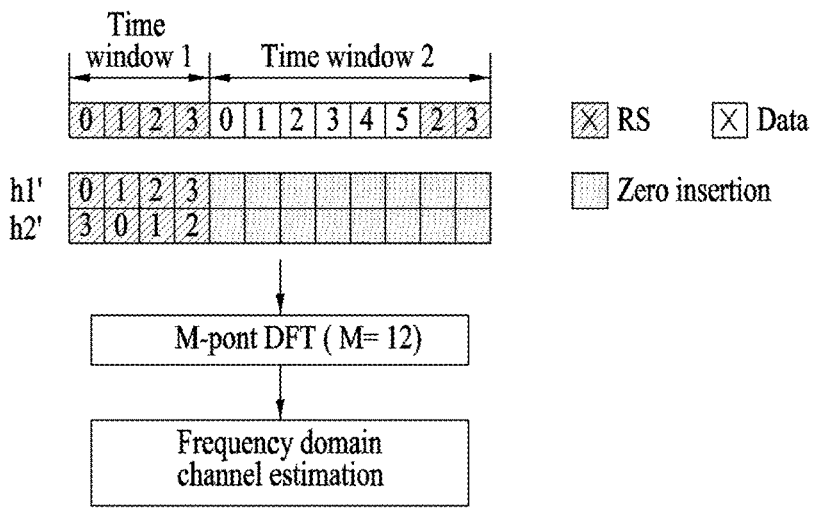
FIG. 16 schematically illustrates a configuration where channel estimation is performed based on an RS according to an embodiment of the present invention.

FIG. 16 schematically illustrates a configuration where channel estimation is performed based on an RS according to an embodiment of the present invention.

As an example of the channel estimation method, when channel estimation is performed through an RS in time window 1, the receiver may process the values of the remaining samples except the samples in time window 1 among all samples of the received signal as zero and then obtain a signal where the (DFT-converted) RS is multiplied with a channel gain per frequency by applying the (M-point or N-point) DFT operation as shown in FIG. 16. Thereafter, the receiver may estimate a channel by applying the channel estimation method, which depends on how the receiver is implemented.

In addition, in the case of a signal where the UCI and the duplication of some rear signals for the RS are combined, the receiver may receive the combined signal by assuming that the CP is applied for the corresponding signal during a time widow (which corresponds to or is proportional to the sum of the lengths of the UCI and the duplication of some rear signal for the RS) (hereinafter, the time window is referred to as time window 2), which appears after time window 1.

Figure 17:
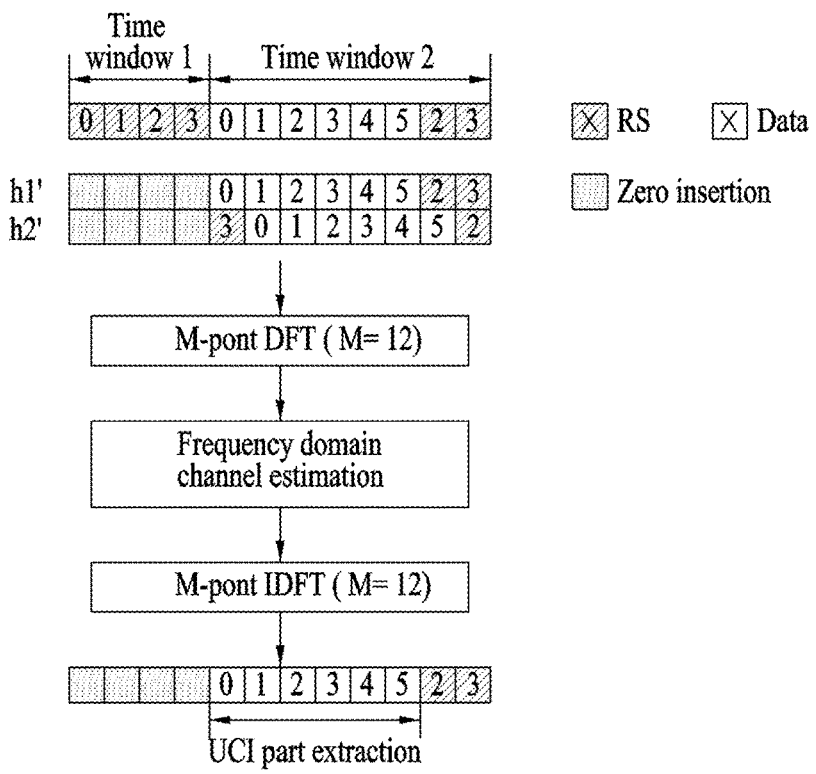
FIG. 17 schematically illustrates a configuration where channel estimation is performed based on an RS according to another embodiment of the present invention.

FIG. 17 schematically illustrates a configuration where channel estimation is performed based on an RS according to another embodiment of the present invention.

As shown in FIG. 17, to extract the UCI from the combined signal, the receiver may process the values of the remaining samples except the samples in time window 2 as zero, compensate for channel values in the frequency domain using the channel previously estimated from time window 1 by applying the (M-point or N-point) DFT operation, and then eliminate the samples corresponding to the duplication of some rear signals for the RS after performing restoration in the time domain by applying the (M-point or N-point) IDFT operation again. By doing so, the BS may extract the UCI from the combined signal.

As another example, when performing the channel estimation through the RS in time window 1, the receiver may obtain a signal where the (DFT-converted) RS is multiplied with a channel gain per frequency by applying the DFT operation to the samples in time window 1 of the received signal. In this case, the receiver may estimate a channel by applying the channel estimation method, which depends on how the receiver is implemented.

More specifically, to extract the UCI from the combined signal, the receiver may convert it into a frequency-domain signal by applying the DFT operation to the samples in time window 2, compensate for the channel values per frequency of the signal obtained by performing DFT-conversion on the samples in time window 2 by oversampling the channel estimated from time window 1 based on the number of samples in time window 2, and then extract only the samples corresponding to the UCI transmission window by creating a time-domain signal through the IDFT operation.

According to the above-described configuration, it is possible to distinguish between the RS and data with relatively easy implementation while minimizing the restriction on the RS and data transmission structures or signal overhead. For example, as a general inter-symbol interference (ISI) cancellation method, if the CP for an RS is added in front of the RS and the CP for data is added in front of the data, additional CP overhead may occur.

As a modification example applicable to the present invention, when the transmitter configures M time-domain samples to perform M-point DFT precoding, a method by which the CP for an RS (hereinafter referred to as the RS-CP) is arranged in the time domain, modulation signals for the RS is arranged, and then modulation signals for data are arranged may be applied. More specifically, assuming that the RS is represented by r[0], r[1], r[2], r[L1] and the data is represented by d[0], d[1], d[2], d[L2], the transmitter may configure the M (=L1+L2+K) samples for M-point DFT precoding according to Equation 2 below.

$$X=[r[L1-(K-2)], r[L1], r[0], r[1], \ldots, r[L1], d[0], d[1], d[2], \ldots d[L2], r[L1-(K-1)]] \quad \text{[Equation 2]}$$

In Equation 2, the value of K (the ratio between M and K or the ratio between L1 and K) may be determined between the BS and UE according to a predetermined method or configured by the BS through a higher layer signal (e.g., RRS signaling) or a dynamic control signal (e.g., L1/L2 signaling).

Figure 18:
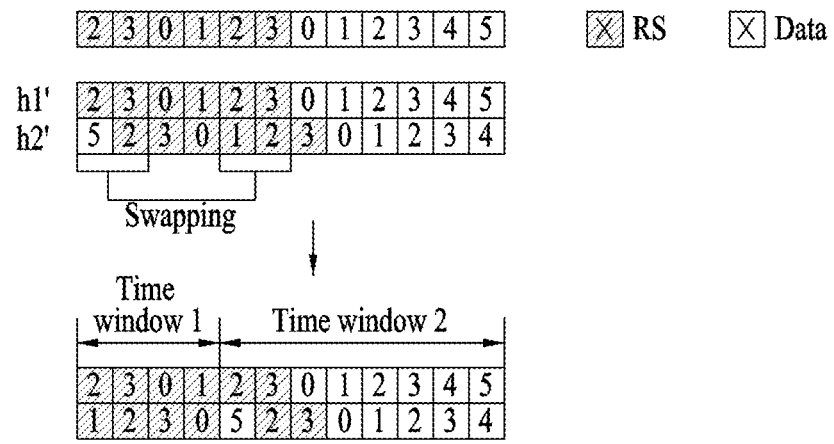
FIG. 18 schematically illustrates a configuration where a receiver receives a signal according to the present invention.

FIG. 18 schematically illustrates a configuration where a receiver receives a signal according to the present invention.

As a modification example of the present invention, when the receiver swaps some samples in the time window corresponding to the length of the front RS-CP included in the time window (corresponding to or proportional to the RS length) of the received signal with some samples in the time window corresponding to the length of the rear RS-CP, the signal generated as described above may have a signal transmission window (time window 1) where the RS and the CP for the RS are applied and a signal transmission window (time window 2) where a signal, which is obtained by combining the UCI and RS-CP in a TDM manner, and the CP for the corresponding combined signal are applied. In the case, channel estimation and data extraction methods for the receiver may be similar to the above-described methods.

The above-described configuration can be applied together with other proposed methods of the present invention unless they collide with each other.

3.2. Separation of UCI and RS in Frequency Domain

When a transmitter configures M time-domain samples (where M=K*L) to perform M-point DFT precoding, the transmitter may configure L samples by combining an RS and data in the time domain in a TDM manner, configure M samples by repeating the L samples K times, and then apply phase rotation as follows according to whether the $m^{th}$ sample, X[m] (where m=0, 1, . . . , M−1) among the M samples is for either the RS or data.

(1) When X[m] is a sample for the RS, $$X[m]'=X[m]*\exp(j*2\pi*k0*m/M), k0 \in \{0,1, \ldots, K-1\}, k0 \neq k1$$

(2) When X[m] is a sample for the data, $$X[m]'=X[m]*\exp(j*2\pi*k1*m/M), k1 \in \{0,1, \ldots, K-1\}, k0 \neq k1$$

In the case, the value of K (the ratio between M and L) may be determined between the BS and UE according to a predetermined method or configured by the BS through a higher layer signal (e.g., RRS signaling) or a dynamic control signal (e.g., L1/L2 signaling).

Figure 19:
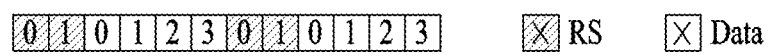
FIG. 19 schematically illustrates a time-domain signal generated according to an embodiment of the present invention.

FIG. 19 schematically illustrates a time-domain signal generated according to an embodiment of the present invention.

When there are two samples for an RS and four samples for data and when M-point DFT precoding is performed for M=12, the transmitter may generate a time-domain signal by repeating a partial signal K times (where K=2) as shown in FIG. 19.

Next, if the $m^{th}$ sample (where m=0, 1, . . . , M−1) is a sample for the RS, the transmitter does not change the phase. On the contrary, if the $m^{th}$ sample is a sample for the data, the transmitter may apply the phase rotation by multiplying the value of exp(j*2π*1*m/M) (k0=0 and k1=1).

Figure 20:
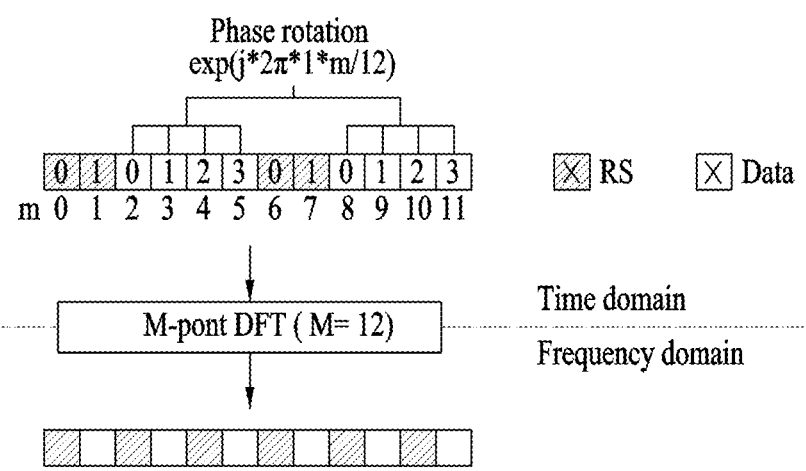
FIG. 20 schematically illustrates a configuration where an RS and data are distinguished from each other in the frequency domain according to an embodiment of the present invention.

FIG. 20 schematically illustrates a configuration where an RS and data are distinguished from each other in the frequency domain according to an embodiment of the present invention.

As shown in FIG. 20, the RS and data may be respectively allocated to odd comb resources and even comb resources after DFT precoding so that they can be distinguished from each other in the frequency domain.

Therefore, after distinguishing between the RS and data in the frequency domain, the receiver may preferentially perform channel estimation based on the RS and then demodulate the data using the estimated channel.

In general, the transmitter may configure M samples for DFT precoding by combining P signals (where P≤K) in L samples in a TDM manner as described above before M-point DFT precoding and repeat the signals K times. Next, the transmitter may transmit each of the P signals on one among K comb resources in the frequency domain.

Specifically, when a transmitter configures M time-domain samples (where M=K*L) to perform M-point DFT precoding, the transmitter may configure L samples by combining P signals (where P≤K) in a TDM manner, configure M samples by repeating the L samples K times, and then apply phase rotation as follows according to which signal the $m^{th}$ sample, X[m] (where m=0, 1, . . . , M−1) among the M samples is for.

1) When X[m] is the $p0^{th}$ signal, $$X[m]'=X[m]*\exp(j*2\pi*k0*m/M), k0 \in \{0,1, \ldots, K-1\}$$

2) When X[m] is the $p1^{th}$ signal (where p1≠p0), $$X[m]'=X[m]*\exp(j*2\pi*k1*m/M), k1 \in \{0,1, \ldots, K-1\}, k1 \neq k0$$

3) When X[m] is the p2th signal (where p2≠p0 and p2≠p1), $$X[m]'=X[m]*\exp(j*2\pi*k2*m/M), k2 \in \{0,1, \ldots, K-1\}, k2 \neq k0 \text{ and } k2 \neq k1$$

According to the above-described configuration, when the required amount of resources is not great due to the small payload size of data to be transmitted, the RS and data can be completely distinguished from each other in the frequency domain and the low-PAPR characteristics can also be achieved.

The above-described configuration can be applied together with other proposed methods of the present invention unless they collide with each other.

Figure 21:
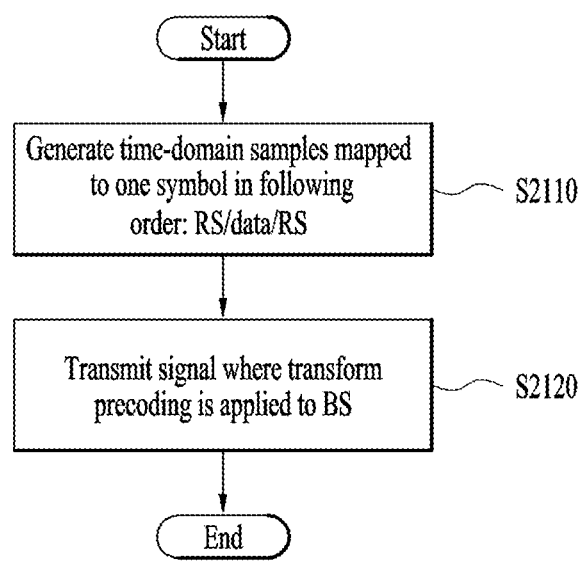
FIG. 21 schematically illustrates a signal transmitted method for a UE according to an embodiment of the present invention.

FIG. 21 schematically illustrates a signal transmitted method for a UE according to an embodiment of the present invention.

First, the UE generates time-domain samples for a reference signal (RS) and data, which are mapped to one symbol [S2110]. In this case, the time-domain samples may be arranged in the following time-domain order: first RS samples, data samples, and second RS samples.

In this case, the data samples may correspond to uplink control information (UCI) samples.

In addition, the UE may use the following various methods to generate the time-domain samples.

First, the first RS samples may be composed of some of the second RS samples.

On the contrary, the second RS samples may be composed of some of the first RS samples.

In this case, the RS sample may include a demodulation reference signal (DM-RS) or a phase tracking reference signal (PT_RS).

Next, the UE transmits, to the BS, a signal, which is generated by applying transform precoding to the generated time-domain samples [S2120].

In this case, as the transform precoding, discrete Fourier transform (DFT) precoding may be applied to the generated time-domain samples.

In addition, the BS may receive the signal according to the following method.

First, the BS receives the signal from the UE. Next, the BS estimates a transmission channel by applying a discrete Fourier transform (DFT) operation to samples in a first time window of the received signal, extracts data samples by compensating for channel values for samples in a second time window using the estimated transmission channel, and obtains data information based on the extracted data samples.

Since each of the embodiments of the above-described proposed methods may be considered as one method for implementing the present invention, it is apparent that each embodiment can be regarded as a proposed method. In addition, the present invention can be implemented not only using the proposed methods independently but also by combining (or merging) some of the proposed methods. Moreover, a rule may be defined such that the BS should inform the UE of information on whether the proposed methods are applied (or information on rules related to the proposed methods) through a predefined signal (e.g., physical layer signal, higher layer signal, etc.).

4. Device Configuration

Figure 22:
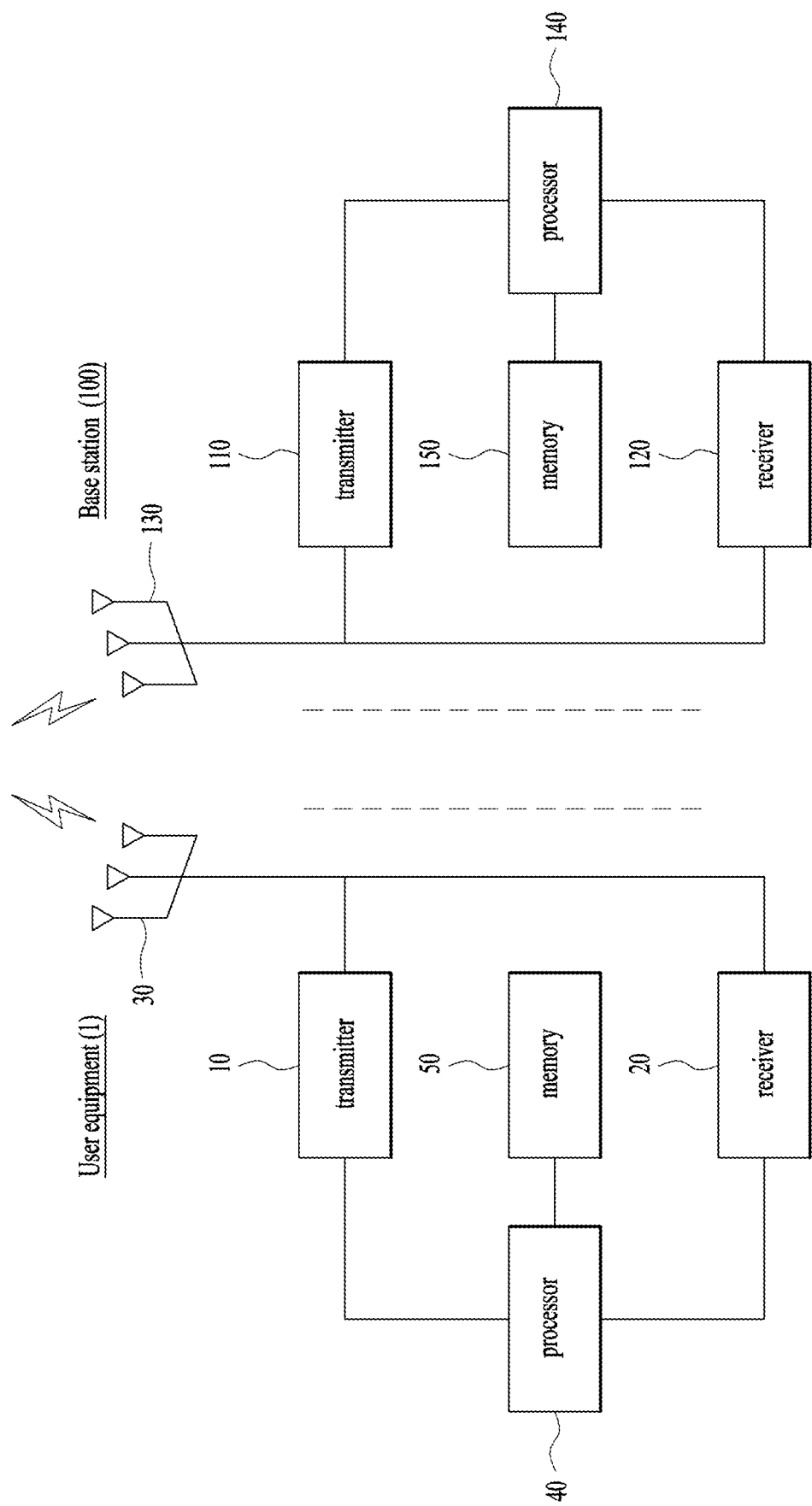
FIG. 22 illustrates the configurations of a UE and a BS for implementing the proposed embodiments.

FIG. 22 is a diagram illustrating configurations of a user equipment (UE) and a base station (BS) capable of being implemented by the embodiments proposed in the present invention. The UE and BS illustrated in FIG. 22 operate to implement the above-described embodiments of the method for transmitting and receiving signals therebetween.

A UE 1 may act as a transmission end on a UL and as a reception end on a DL. A BS (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

With the above-described configuration, the UE 1 generates time-domain samples for a reference signal (RS) and data, which are mapped to one symbol, through the processor 40. In this case, the time-domain samples are arranged in the following time-domain order: first RS samples, data samples, and second RS samples. Next, the UE transmits, a signal, which is generated by applying transform precoding to the generated time-domain samples, to the BS 100 through the transmitter 10.

In addition, the BS 100 receives the signal from the UE through the receiver 120. Next, the BS 100 estimates. Next, the BS controls the processor 140 to estimate a transmission channel by applying a discrete Fourier transform (DFT) operation to samples in a first time window of the received signal and extract data samples by compensating for channel values for samples in a second time window using the estimated transmission channel. Thereafter, the BS 100 obtains data information based on the data samples extracted through the processor 140.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 22 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method of transmitting a signal to a base station (BS) by a user equipment (UE) in a wireless communication system, the method comprising:
generating a signal based on transform precoding for a plurality of samples,
wherein the plurality of samples are included in one orthogonal frequency-division multiplexing (OFDM) symbol,
wherein the plurality of samples comprises (i) a first plurality of reference signal (RS) samples that are arranged at a beginning of the plurality of samples, (ii) a second plurality of RS samples that are arranged at an end of the plurality of samples, and (iii) uplink data samples arranged between the first plurality of RS samples and the second plurality of RS samples, and
wherein a plurality of values for the signal are generated based on the transform precoding for the plurality of samples, and the plurality of values for the signal are mapped to different frequency resources in the one OFDM symbol; and
transmitting, to the BS, the signal.

2. The method of claim 1, wherein the first plurality of RS samples include parts of the second plurality of RS samples.

3. The method of claim 1, wherein the second plurality of RS samples include parts of the first plurality of RS samples.

4. The method of claim 3, wherein based on the first plurality of RS samples being sequentially composed of a third plurality of RS samples and a fourth plurality of RS samples, the second plurality of RS samples are identical to the fourth plurality of RS samples.

5. The method of claim 1, wherein the transform precoding comprises discrete Fourier transform (DFT) precoding for the plurality of samples in the one OFDM symbol.

6. A user equipment (UE) configured to transmit a signal to a base station (BS) in a wireless communication system, the UE comprising:
a transmitter;
at least one processor; and
at least one computer-readable memory operably connectable to the at least one processor and storing instructions that, based on being executed by the at least one processor, control the UE to perform operations comprising:
generating a signal based on transform precoding for a plurality of samples,
wherein the plurality of samples are included in one orthogonal frequency-division multiplexing (OFDM) symbol,
wherein the plurality of samples comprises (i) a first plurality of reference signal (RS) samples that are arranged at a beginning of the plurality of samples, (ii) a second plurality of RS samples that are arranged at an end of the plurality of samples, and (iii) uplink data samples arranged between the first plurality of RS samples and the second plurality of RS samples, and
wherein a plurality of values for the signal are generated based on the transform precoding for the plurality of samples, and the plurality of values for the signal are mapped to different frequency resources in the one OFDM symbol; and
transmitting, to the BS, the signal.

7. The method of claim 1, wherein the plurality of samples in the one OFDM symbol are transformed, by applying the transform precoding, into the plurality of values for the signal.

8. The method of claim 7, wherein the plurality of values for the signal are mapped to a plurality of subcarriers for the one OFDM symbol.

9. The UE of claim 6, wherein the first plurality of RS samples include parts of the second plurality of RS samples.

10. The UE of claim 6, wherein the second plurality of RS samples include parts of the first plurality of RS samples.

11. The UE of claim 10, wherein based on the first plurality of RS samples being sequentially composed of a third plurality of RS samples and a fourth plurality of RS samples, the second plurality of RS samples are identical to the fourth plurality of RS samples.

12. The UE of claim 6, wherein the transform precoding comprises discrete Fourier transform (DFT) precoding for the plurality of samples in the one OFDM symbol.

13. The UE of claim 6, wherein the plurality of samples in the one OFDM symbol are transformed, by applying the transform precoding, into the plurality of values for the signal.

14. The UE of claim 13, wherein the plurality of values for the signal are mapped to a plurality of subcarriers for the one OFDM symbol.

* * * * *